United States Patent Office.

WOODWARD E. WERTENBAKER, OF WASHINGTON, DISTRICT OF COLUMBIA.

Letters Patent No. 112,995, dated March 21, 1871.

IMPROVEMENT IN FUEL AND KINDLING-WOOD.

The Schedule referred to in these Letters Patent and making part of the same.

*To all whom it may concern:*

Be it known that I, WOODWARD E. WERTENBAKER, of the city and county of Washington, in the District of Columbia, have invented an Improved Composition for Saturating Kindling-Wood; and I do hereby declare the following to be a full, clear, and exact description of the same.

This invention relates to that class of compositions or compounds that is employed for coating or saturating fuel to increase its combustibility; and It has for its object—

First, to render the manufacture of such improved fuel safer than heretofore;

Secondly, to produce a composition adapted to the purpose which will not grow soft in hot weather;

Thirdly, to improve the quality of such compositions, so as greatly to increase the range of their application; in other words, to produce a composition which, when properly applied, will make good fuel out of substances that the public have never heretofore been able to use for such purposes; and Fourthly, to utilize a material that has, up to this time, been considered nearly worthless, and has been allowed at the manufactories to run to waste.

To this end it consists in the application of two substances, known to the arts as "coal-tar" and "acid tar," to any suitable material, as a base for the fuel, in the manner substantially as I will now proceed to set forth.

I take about eighty parts of acid tar to twenty parts of coal-tar; mix them thoroughly by boiling together, and when at a high degree of heat, say about the boiling temperature, I apply them to the fuel by immersing it in the composition thus formed, or by pouring the composition over the articles intended to be used. I then allow the coated or saturated material to stand about fifteen minutes in the open air, when it will be ready for use, and can be handled with impunity or transported to the hottest climates without danger of softening or becoming sticky.

In this composition the coal-tar is employed as a hardening element, and the acid tar to increase combustibility. The proportions may be varied, therefore, within certain limits, care being taken to have acid tar enough to make the material as combustible as is desired, and coal-tar enough to produce the requisite degree of hardness in the composition when it is dry.

When carefully prepared, the proportion of coal-tar may be as low as fifteen per cent. for kindling material, or it may be as high as forty or fifty per cent. for common fuel, instead of twenty per cent., as above stated.

Almost any thing may be used as a base, such as, for example, wood, corn-stalks or cobs, coke, coal-cinder or ashes, peat, and other substances convenient to obtain in suitable quantities at little expense, and varying with the localities where the manufacture is carried on.

I have found, by practical experiment, for instance, that, by saturating with this composition the coal-ashes and cinders that are now wasted by almost every family in cities, four-fifths of such waste material can be utilized as a fuel, so that a material which has been heretofore regarded not merely as waste but as a nuisance, which actually has to be removed at public expense, may hereafter become a profitable commodity.

The two great advantages, however, which I would particularly specify as resulting from the use of my improved composition, are those first above enumerated, viz., the safety of its manufacture and its adaptation to warm climates.

The residuum of coal-oil distilleries has been heretofore employed, in combination with other materials, for saturating fuel. The manufacture is, however, exceedingly dangerous, since the residuum is a very impure substance, which, when boiled or heated, foams to a most extraordinary degree, a single gallon of it swelling in two or three minutes to such an extent as to run over the sides of an eighty-gallon kettle. The moment that such froth runs over the kettle and falls into the fire or upon the furnace there is, of course, a conflagration. Hence, the manufacture of kindling-wood saturated with any of the compounds of coal-oil residuum has been generally abandoned as impracticable.

On the other hand, the acid tar which I employ, while equally as inflammable as said residuum, does not froth at all when boiled, but hardens with a tendency to granulation, somewhat resembling molasses, thereby preventing all liability to that class of accidents which has rendered the manufacture with coal-oil residuum so extra hazardous.

The adaptation of fuel prepared by my process to every variety of climate is one of its distinguishing features. In fifteen minutes after it has been removed from the kettle or vat to dry it is so hard, and its hardness is so permanent and so incapable of being affected by the weather, that it may be carried in a white pocket-handkerchief from the coldest to the warmest climates without soiling the linen or sticking to it in the least.

This quality, it will be particularly observed, is common to all the fuel manufactured by my process. I am not obliged, therefore, to manufacture one article for northern and another for southern use, but the article that I manufacture may be used with equal convenience everywhere.

In this respect my manufacture differs essentially from those of Dayton and others, who use resin, coal-oil residuum, and other similar ingredients. To adapt the Dayton article to use in the south eighty per cent. of resin must be used; and if we thus diminish the percentage of residuum (the principal ingredient used for increasing combustibility) we are obliged to sacrifice combustibility to the necessity of keeping the fuel hard in summer, and the result is that we get but little more than wood coated with resin, an article long used and known for such purposes. On the other hand, my fuel has always eighty per cent. of combustible material.

The fuel prepared by my process is water-proof, and may be taken out of the water and instantly lighted with a match without drying it.

I am aware that corn-cobs saturated with petroleum have been used as fuel by Budd & Husband, as shown by their Letters Patent granted July 12, 1864, and their subsequent improvements thereon; and, as above stated, I am also aware that Henry G. Dayton uses the residuum of petroleum distillation, in combination with resin, for saturating corn-cobs, as shown by his Letters Patent dated November 20, 1866, and his subsequent improvements.

I claim neither corn-cobs, petroleum, resin, the residuum of petroleum distillation, nor any compound or combination of these substances; but

Having thus described my invention,

What I claim as new therein, and desire to secure by Letters Patent, is—

The composition, consisting of coal-tar and acid tar, when combined in the proportions and employed in the manner and for the purpose substantially as described.

WOODWARD E. WERTENBAKER.

Witnesses:
  A. C. RAWLINGS,
  N. K. ELLSWORTH.